United States Patent [19]
Jones

[11] Patent Number: 5,769,440
[45] Date of Patent: Jun. 23, 1998

[54] WHEELCHAIR WITH MOBILE ACCESSORY

[75] Inventor: Cardell I. Jones, Savannah, Ga.

[73] Assignee: St. Joseph's Hospital, Inc., Savannah, Ga.; a part interest

[21] Appl. No.: 609,598

[22] Filed: Mar. 5, 1996

[51] Int. Cl.⁶ .................................................. B62K 27/00
[52] U.S. Cl. ...................................... 280/204; 280/304.1
[58] Field of Search ............................. 280/304.1, 304.5, 280/250.1, 204, 288.4, 292, 503, 656, 33.992; 180/907

[56] References Cited

U.S. PATENT DOCUMENTS

| | | | |
|---|---|---|---|
| 3,792,875 | 2/1974 | Paden | 280/503 |
| 4,158,428 | 6/1979 | Bates | 224/42.42 A |
| 4,305,601 | 12/1981 | Berge | 280/289 |
| 4,484,755 | 11/1984 | Houston | 280/33.99 A |
| 4,511,157 | 4/1985 | Wilt, Jr. | 280/289 |
| 4,659,099 | 4/1987 | Malone | 280/304.1 |
| 4,729,447 | 3/1988 | Morse | 180/907 |
| 4,795,182 | 1/1989 | Dyess et al. | 280/289 |
| 4,902,029 | 2/1990 | Gain et al. | 280/304.1 |
| 5,064,209 | 11/1991 | Kurschat | 280/250.1 |
| 5,219,139 | 6/1993 | Hertzler et al. | 280/304.1 |
| 5,316,328 | 5/1994 | Bussinger | 280/304.1 |
| 5,454,577 | 10/1995 | Bell | 280/204 |

*Primary Examiner*—Paul N. Dickson
*Attorney, Agent, or Firm*—Kennedy, Davis & Kennedy, P.C.

[57] ABSTRACT

A wheelchair (20) is detachably coupled with a mobile accessory (10), by a hitch (30). The hitch (30) includes a J-bar (31) and bracket assemblies (33). The J-bar (31) may be pivoted between operational and stowed positions on the wheelchair (20).

2 Claims, 2 Drawing Sheets

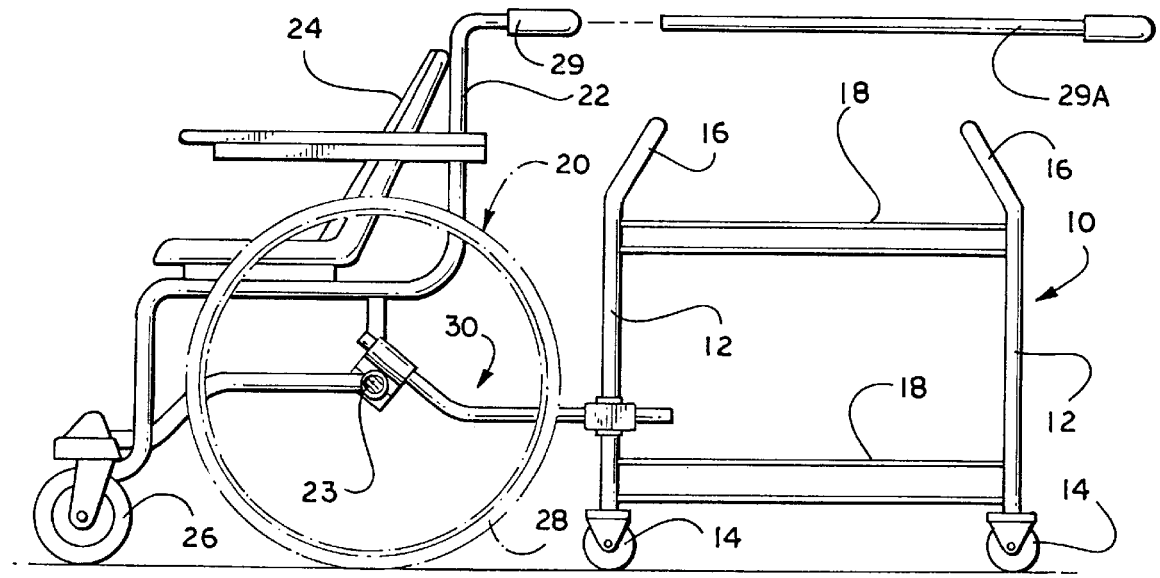
Fig_1
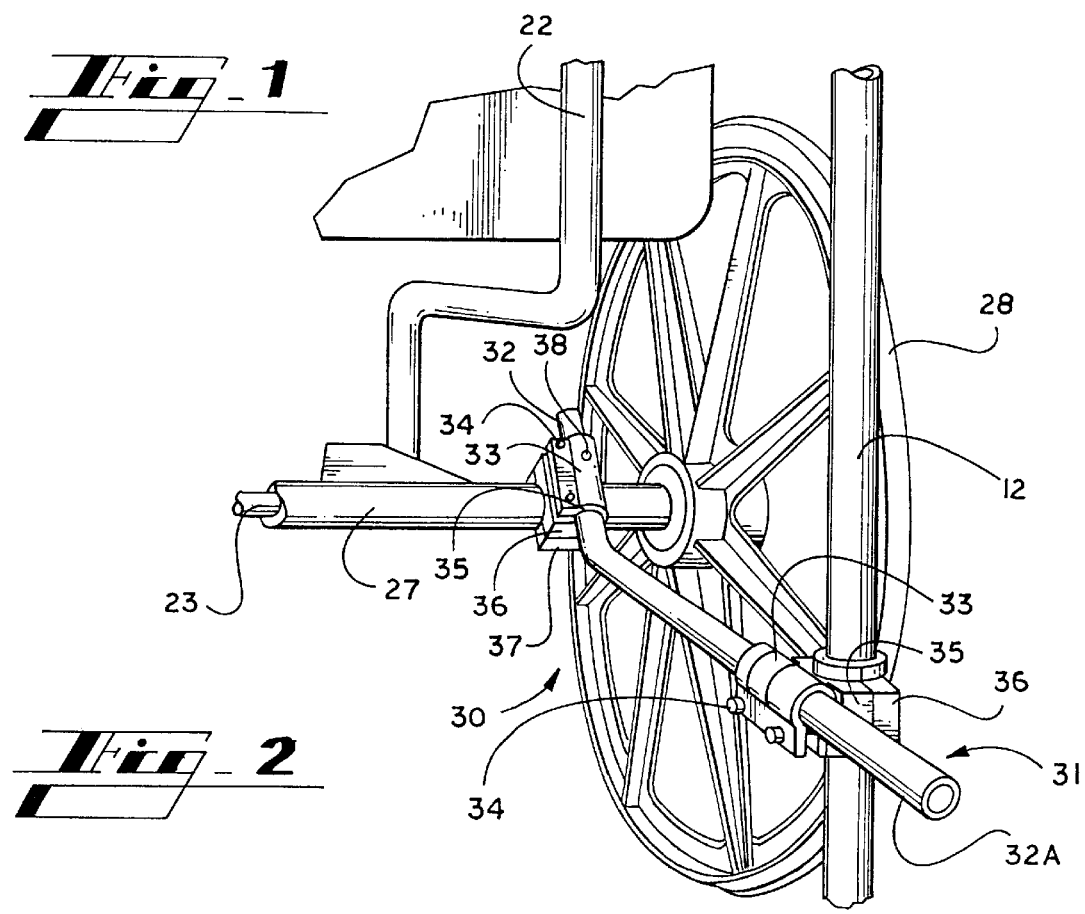
Fig_2

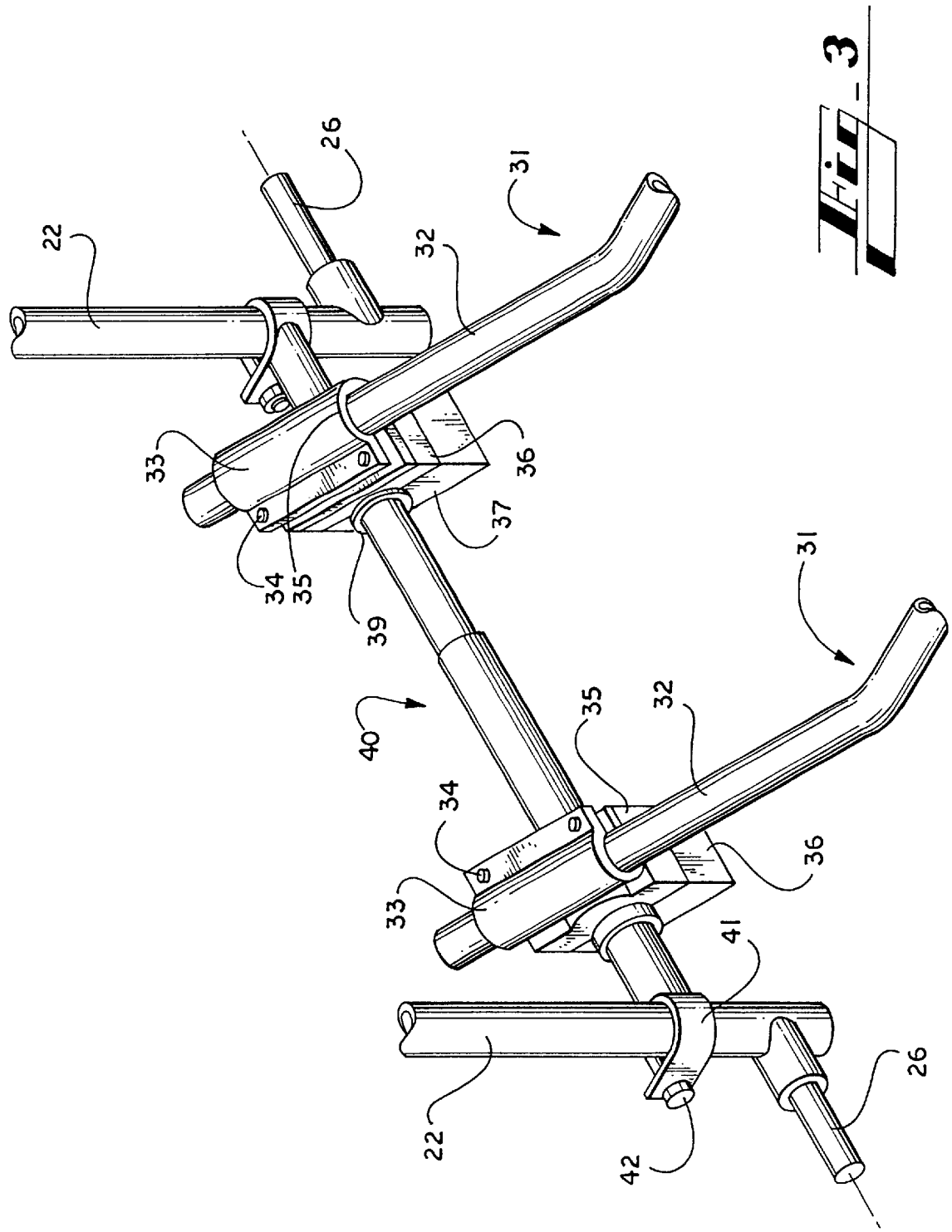

WHEELCHAIR WITH MOBILE ACCESSORY

TECHNICAL FIELD

The present invention relates generally to wheelchairs. More particularly, the invention relates to wheelchairs with mobile accessories such as carts, I.V. stands, oxygen stands and the like.

BACKGROUND OF THE INVENTION

Wheelchairs exist for the nonambulatory. Sometimes, these individuals have goods with them which are too large or bulky to be carried in their laps as their hands are used to drive the chair. Even in hospital environments where a nurse or attendant pushes the wheelchair, leaving the wheelchair-bound person's hands free to hold articles, the individual's ability to carry goods is limited. Thus often the attendant must make a second trip to get the rest of the patient's personal effects. Additionally, sometimes there are apparatuses which need to be moved in tandem with the chair such as an I.V. stand or oxygen tank.

Thus heretofore wheelchairs have been devised with ancillary devices attached to them or integrated into their own structure. For example, U.S. Pat. No. 4,902,029 describes a wheelchair with a permanently integrated rear luggage carrier. The luggage carrier has a low profile to allow for the nesting of one wheelchair within another. The chair portion of the wheelchair fits into the carrier portion, so that several chairs may be stored compactly.

U.S. Pat. No. 4,484,755 describes a wheeled cart for use by handicapped, invalid, and frail persons. The cart is mounted in front of the wheelchair and held in place by brackets.

U.S. Pat. No. 4,305,601 describes a shopping cart for the handicapped. The cart is attached by a releasable hitch to a wheelchair frame using open ended U-shaped brackets to grasp the tubular vertical frame supports of the wheelchair. The hitch includes an adjustable socket for sliding movement. Again, the cart is mounted to the front of the chair.

U.S. Pat. No. 4,511,157 describes an apparatus for facilitating I.V. feeding during transportation of a patient in a wheelchair. The apparatus includes an elongated rectangular tube which is held onto vertical elements of a wheelchair frame by clips. The tube receives an elongated rectangular rod which is held in place at one end by set screws. The rod is secured to an I.V. stand in front of the chair.

The just described wheelchair-accessory combinations have had a number of problems. Many of the accessories have not been sufficiently secured to the chairs. Many have restricted the nonambulatory person's ingress and egress from the chair. Front loaded wheelchairs also restrict the riders forward view. The low profile of the integrated carrier requires a second person to load luggage in the carrier and to push the chair. The combined wheelchair-carrier is not readily able to accommodate other attachments. Additionally, since the luggage carrier is fully integrated with the wheelchair, the two may not be separated for independent, detached operational use.

Accordingly, it is seen that a need remains for a wheelchair with a mobile accessory which does not restrict ingress and egress from the chair or restrict a user's forward view, and which can be readily separated into two independently operational units and readily reunited, and which may be used by the wheelchair-bound person either alone or with the assistance of another person. It is to the provision of such that the present invention is primarily directed.

SUMMARY OF THE INVENTION

In a preferred form of the invention, a wheelchair and mobile accessory combination includes a wheelchair, a mobile accessory, and a hitch for maintaining the mobile accessory in a trailing position behind the wheelchair. The wheelchair has a seat supporting frame with a forward portion and a rear portion. The frame rear portion includes a transverse member. At least one front wheel is pivotally mounted to the frame forward portion. Two rear wheels mounted to the frame rear portion straddle the transverse member. The mobile accessory has a frame that includes an upright member and wheels.

The combination further comprises a detachable hitch for hitching the mobile accessory to the wheelchair in a trailing position which includes at least one bar. The hitch also has a forward clamp for clamping a forward portion of the bar to the wheelchair frame transverse member in a plurality of bar orientations and rear clamp means for detachably clamping the mobile accessory to a rear portion of the bar. With this construction, a self standing mobile accessory may be readily hitched to a self standing wheelchair for movement in tandem without restricting patient ingress to and egress from the wheelchair. The two mobile units may also be readily detached for independent mobile use and the hitch moved to a stowed upright position on the wheelchair.

BRIEF DESCRIPTION OF THE DRAWINGS

FIG. 1 is a side view of a wheelchair with a trailing mobile cart that embodies principles of the invention in a preferred form.

FIG. 2 is a perspective view of a portion of the apparatus of FIG. 1.

FIG. 3 is a perspective view of a portion of a wheelchair with trailing mobile cart according to another embodiment of the invention.

DETAILED DESCRIPTION

With reference next to the drawings, there is shown in FIGS. 1 and 2, a cart 10 of conventional construction secured to a wheelchair 20, also of conventional construction. The cart 10 has four legs 12 with pivotal wheels or casters 14, two transverse handles 16, and upper and lower shelves 18. Wheelchair 20 has a frame 22, adjacent a rear end of which an axle 23 is journaled within a tubular cover 27 of the frame. The axle cover 27 is rigidly mounted to frame 22 as are two handles 29. Two large rear wheels 28 are mounted to opposite ends of the axle. The wheelchair also has a seat 24, and two, small, front wheels 26 pivotally mounted to a forward end of the frame 22.

With specific reference to FIG. 2, the apparatus is seen to include a hitch 30 comprising a J-bar 31 and two bracket assemblies 33. The J-bar 31 has a forward inclined portion 32 and a rear level portion 32A. The forward portion 32 is detachably mounted to axle cover 27 by means of one of the bracket assemblies 33, and nuts and bolts 34. One of the bracket assemblies 33 comprises a C-clamp 35 mounted about J-bar forward portion 32, and two mounting plates 36 and 37 mounted about axle cover 27. The C-clamp 35 and plates 36 and 37 are secured together and about the axle cover and J-bar with nuts and bolts 34.

In a similar fashion the rear J-bar portion 32A is detachably mounted to a cart leg 12 by the other bracket assembly 33. If desired, rivets 38 provide additional support. Finally, as shown in FIG. 3, a rubber gasket 39 is placed beneath bracket assemblies 33 to further secure the bracket assemblies to the wheelchair axle and trailer leg. Two J-bar hitches are preferably used to support a cart, while one J-bar hitch is used to support an independently mobile I.V. or oxygen stand having at least three pivotal wheels and an upright frame member in the form of a stanchion.

In use, a patient or nonambulatory person sits down in the wheelchair unencumbered by the presence of the cart. Personal effects are placed on the cart shelves and either the chair and trailing cart are pushed by another person or the nonambulatory person drives the chair and trailing cart. As the wheelchair is moved the pivotal wheels 14 of cart 10 follow the path of the pivotal wheels 26 of wheelchair 20. With the cart rigidly secured to the wheelchair, the pivotal wheels 26 of the cart always remain spaced behind the wheelchair wheels 28 where they cannot contact one another. Alternatively, another wheeled, mobile device such as an I.V. stand or oxygen stand can be coupled to the J-bar with a clamp.

The forward inclined portion 32 of J-bar 31 is preferably at a 30 degree angle from the rear level portion 32A to impart stability to the overall apparatus and yet allow for movement of the J-bar into a storage position. In other words, due to this shape of the J-bar, it may remain attached to a wheelchair, in an upright position close to the back of the chair seat 22 if desired. The hitch or hitches are raised to a storage position between the rear wheelchair wheels 28 to close proximity to the chair back. This is done by uncoupling the accessory from the rear portion of the J-bar, then momentarily loosening the nuts and bolts of the forward J-bar bracket assemblies and rotating the J-bar to an upright position and then tightening back the nuts and bolts.

Once a cart or other mobile unit is to be attached in tandem to the wheelchair, the J-bar hitch, or hitches as the case may be, is lowered back into position shown, by loosening and then retightening the nuts and bolts of the C-clamp attached to the wheelchair frame in the position shown in FIGS. 1 and 2. If it is desired to attach an I.V. stand to the chair, only one of a pair of hitches need be lowered into position. Preferably two J-bar hitches are attached to a wheelchair, even though only one may be needed at a time.

An alternative embodiment is shown in FIG. 3 which includes a conventional collapsible-type wheelchair with two coaxially aligned independent axles 26. Axles 26 are journaled to vertical supports of wheelchair frame 22. The frame includes a collapsible horizontal support 40 comprised of two telescoped tubes spanning the vertical supports of wheelchair frame 22 and which is mounted thereto by adjustable C-clamps 41 and bolts 42 above the common axis of the two axles 26.

One or two J-bar hitches are then attached to the support. If the chair needs to be collapsed for storage or transport purposes, the horizontal support also collapses without necessitating removal of the J-bar hitches. In such case the cart or other trailing mobile unit is detached from the J-bars and the J-bars are then rotated to an upright position by momentarily loosening and then retightening the C-clamps.

If desired the wheelchair may be equipped with handle extensions 29A. Extension handles may be secured by pins through aligned holes, or by fitted handle extensions which may be placed within or around the handle ends.

It thus is seen that a wheelchair with trailing mobile unit is now provided which allows a user clear entry and exit from the wheelchair, which does not obstruct the view of a rider, and which is readily detachable for compact storage or independent operation without rendering either the wheelchair or trailing unit immobile. In operation, it avoids difficulty of a nonambulatory person in manipulating a cart or I.V. stand and a wheelchair together, and assists hospital staff in the transport of such persons together with their personal belongings or ancillary medical equipment.

Though the wheelchair and trailing mobile unit has been shown and described in its preferred forms, many modifications, additions, and deletions may be made thereto without departing from the spirit and scope of the invention as set forth in the following claims.

I claim:

1. A wheelchair and mobile accessory combination comprising:

a wheelchair having a frame, said frame having a forward portion and a rear portion that includes a transverse member comprised of two telescopically mounted tubes, at least one front wheel pivotally mounted to said frame forward portion, two rear wheels mounted to said frame rear portion straddling said transverse member, and a seat mounted to said frame;

a mobile accessory having a frame that includes an upright member and a plurality of wheels mounted to said mobile accessory frame;

and means for detachably hitching said mobile accessory to said wheelchair in a wheelchair trailing position that comprises two bars, forward clamp means for clamping a forward portion of one of said bars to one of said tubes in a plurality of bar orientations and with the other bar clamped by another of said forward clamp means to the other of said tubes in a plurality of bar orientations, and rear clamping means for detachably clamping said mobile accessory to rear portions of said bars.

2. A wheelchair and mobile accessory combination comprising:

a wheelchair having a frame, said frame having a forward portion and a rear portion that includes a transverse member, at least one front wheel pivotally mounted to said frame forward portion, two rear wheels mounted to said frame rear portion straddling said transverse member, and a seat mounted to said frame;

a mobile accessory having a frame that includes an upright member and a plurality of wheels mounted to said mobile accessory frame;

means for detachably hitching said mobile accessory to said wheelchair in a wheelchair trailing position that comprises at least one bar having a length, forward clamp means for clamping a forward portion of said at least one bar to said wheelchair frame transverse member in a plurality of bar orientations and rear clamping means for detachably clamping said mobile accessory to a rear portion of said at least one bar; and at least one handle extension of a length greater than said bar length adapted to be mounted to said wheelchair frame over said hitching means.

* * * * *